(12) United States Patent
Schwerzig et al.

(10) Patent No.: US 10,928,599 B2
(45) Date of Patent: Feb. 23, 2021

(54) OPTICAL SUB-ASSEMBLY FOR A MODULE COMMUNICATING OVER OPTICAL FIBER, WITH A DEVICE FOR OPTICAL COUPLING ALIGNED IN A PASSIVE MANNER

(71) Applicant: RADIALL SA, Aubervilliers (FR)

(72) Inventors: Rémy Schwerzig, Rochefort (FR); François Quentel, Ville sous Anjou (FR); Christian Claudepierre, Saint Priest (FR)

(73) Assignee: RADIALL, Aubervilliers (FR)

(*) Notice: Subject to any disclaimer, the term of this patent is extended or adjusted under 35 U.S.C. 154(b) by 0 days.

(21) Appl. No.: 16/406,641

(22) Filed: May 8, 2019

(65) Prior Publication Data

US 2019/0346639 A1   Nov. 14, 2019

(30) Foreign Application Priority Data

May 9, 2018 (FR) ...................................... 1853949

(51) Int. Cl.
*G02B 6/42* (2006.01)

(52) U.S. Cl.
CPC .......... *G02B 6/4228* (2013.01); *G02B 6/423* (2013.01); *G02B 6/426* (2013.01); *G02B 6/4253* (2013.01); *G02B 6/428* (2013.01)

(58) Field of Classification Search
CPC ...... G02B 6/421; G02B 6/4228; G02B 6/423; G02B 6/4246; G02B 6/4248; G02B 6/4263; G02B 6/428; G02B 6/4292
See application file for complete search history.

(56) References Cited

U.S. PATENT DOCUMENTS

| 4,081,208 | A | * | 3/1978 | Meade | G02B 6/3817 385/75 |
| 4,725,128 | A | * | 2/1988 | Bornzin | G02B 6/4212 385/91 |
| 5,065,011 | A | | 11/1991 | Fujihara et al. | |
| 5,631,987 | A | * | 5/1997 | Lasky | G02B 6/4201 385/88 |
| 5,687,270 | A | | 11/1997 | Takizawa | |
| 6,059,463 | A | * | 5/2000 | Althaus | G02B 6/4292 385/92 |
| 6,302,596 | B1 | | 10/2001 | Cohen et al. | |
| 6,659,659 | B1 | | 12/2003 | Malone | |

(Continued)

OTHER PUBLICATIONS

French Preliminary Search Report dated Jan. 17, 2019 from Corresponding French Application No. FR 1853949.

(Continued)

*Primary Examiner* — Daniel Petkovsek
(74) *Attorney, Agent, or Firm* — Pearne & Gordon LLP

(57) ABSTRACT

The present invention relates to an optical sub-assembly for an optoelectronic module (M), designed to provide conversion of an electrical signal from a main electronic board into an optical signal or vice-versa. It comprises an alignment ring which allows the mechanical sub-assembly to be mechanically aligned and to be centered in a passive manner directly upon installation and hence the optical axis of the optoelectronic component to be readily aligned with the axis of the fiber optic ferrule and hence with the optical fiber extended by a complementary ferrule which is accommodated facing it in the holding cage.

15 Claims, 3 Drawing Sheets

(56) References Cited

U.S. PATENT DOCUMENTS

| | | | | |
|---|---|---|---|---|
| 7,093,986 B2* | 8/2006 | Scofet | ............... | G02B 6/4202 |
| | | | | 385/92 |
| 7,313,302 B2* | 12/2007 | Fincato | ............ | G02B 6/4201 |
| | | | | 385/43 |
| 7,410,306 B2* | 8/2008 | Wipiejewski | ....... | G02B 6/4292 |
| | | | | 257/100 |
| 8,244,085 B2 | 8/2012 | Aronson | | |
| 8,834,041 B2* | 9/2014 | Ertel | .................. | G02B 6/3817 |
| | | | | 385/49 |
| 2004/0252736 A1 | 12/2004 | Nakayama et al. | | |
| 2007/0147744 A1 | 6/2007 | Dunn et al. | | |
| 2007/0286553 A1 | 12/2007 | Sone | | |
| 2019/0346637 A1* | 11/2019 | Schwerzig | .......... | G02B 6/4292 |

OTHER PUBLICATIONS

European Office Action dated Sep. 14, 2020 for corresponding European Application No. EP 19 172 301.4 and English translation.

* cited by examiner

OPTICAL SUB-ASSEMBLY FOR A MODULE COMMUNICATING OVER OPTICAL FIBER, WITH A DEVICE FOR OPTICAL COUPLING ALIGNED IN A PASSIVE MANNER

FIELD OF THE INVENTION

The present invention relates to an optical sub-assembly for optoelectronic conversion, generally designed to be brazed onto an electronic board also called printed circuit board, with the acronym PCB, and referred to as substrate electronic board, and designed to convert electrical signals into optical signals or vice-versa.

The term 'optical sub-assembly', or OSA, is used to describe a sub-assembly grouping one or more optoelectronic component(s) and its optical coupling system with one or more optical fibers.

The invention also relates both to a transmitter sub-assembly, designed to carry out the conversion of an electrical signal into an optical signal, and to a receiver sub-assembly designed to carry out the conversion of an optical signal into an electrical signal.

The invention also relates to an optoelectronic module which integrates one or more sub-assemblies on an electronic board in a housing.

The invention also relates to a transmitter-receiver module which combines a receiver sub-assembly and a transmitter sub-assembly which share common electronic circuits and a common electronic board, usually denoted by the term "transceiver", a combination of "TRANSmitter" and "reCEIVER".

The invention relates, in a general manner, to optoelectronic modules designed to be implemented notably in the field of aeronautics, space, defense, that of transport or the medical field or furthermore the field of telecommunications, the field of data communications and the field of industry.

PRIOR ART

Optical link systems are known that use optoelectronic modules and an optical link formed by one or more optical fibers. Each optoelectronic transmitter or receiver module is composed of an electronic board, of an optoelectronic component and of its control electronic component, of one or more optical fibers, which may be 'daisy-chained', and of an optical coupling device between the optoelectronic component and the optical fiber or fibers.

Each module is then fixed by brazing or by means of an electrical connector onto an application board.

A functional optical link system thus comprises at least one transmitter module and at least one receiver optically coupled to the transmitter module via a fiber-optic medium.

The commercial products called D-Lightsys® marketed by the applicant RADIALL may be mentioned which may relate both to a transmitter module and a receiver module, or a "transceiver" system integrating both transmitter and receiver functions.

Although these optical link systems have given, and still give, complete satisfaction in particular in terms of performance, notably for high data rate signals, they may still be improved notably in terms of method of alignment and of costs of production and of assembly of the modules.

Indeed, known optoelectronic modules with optical fibers, such as those present in the D-Lightsys® product range, may necessitate active optical alignments owing either to the implementation of the connection system required to interface with the optical fiber, or to the implementation of the optical fiber directly within the TOSA or the ROSA. These active and very precise alignments generate high costs.

In addition to the need for passive alignment, there are other requirements to be taken into account:

to provide an electro-optical (transmitter) and optoelectronic (receiver) conversion for digital or analog signals within a band from 0 to several tens of gigabits per second (Gbps) or Gigahertz, to allow the optical signal to be transferred from an electronic board to electronic equipment or to another electronic board, to define a robust link, in other words compatible with very harsh environments, such as aerospace, aeronautics, medical, telecoms and that of defense, and notably to be capable of operating at temperatures of −40° C. to +85° C., and/or to be resistant to impacts and vibrations according to the aeronautics standards in force, and/or to high levels of humidity, to have a very low electrical power consumption, typically less than 150 mW.

In particular, the requirements linked to certain applications, onboard or otherwise, mean that the maximum space that an optoelectronic module, whether it be the transmitter or the receiver, can occupy on each application board is very limited.

Furthermore, it may also be advantageous to find interface solutions for coupling with optical fibers that are easy to assemble and readily dismantled without tools.

The Patents U.S. Pat. Nos. 6,302,596 and 8,244,085 each disclose a solution for assembling an optoelectronic sub-assembly of the TOSA or ROSA type with a housing in which an optical lens is installed aligned above the optoelectronic component, chips or VSCEL or DFB laser, carried on and electrically connected to an electronic board.

For these solutions to be robust, they really need a method of alignment between the components that is active or the use of a lens, which will have an impact on the cost of assembly. Moreover, the lens may be sensitive to humidity, and hence this can potentially affect the performance of the module. Furthermore, the use of a principle based on a lens requires the presence of an air cavity, which may be detrimental for certain constraints of hermeticity and of applications such as space applications.

There is accordingly a particular need to improve the optical sub-assemblies of the modules, with a view to reducing the costs of assemblies linked to the active alignments and to overcoming the risks of degradation in the performance linked to humidity.

The aim of the invention is to meet, at least in part, this or these need(s).

DESCRIPTION OF THE INVENTION

For this purpose, the subject of the invention is an optical sub-assembly for an optoelectronic module, designed to provide conversion of an electrical signal from an electronic board into an optical signal or vice-versa, comprising:

a carrier electronic board, designed to serve as an interface with another electronic board;

an optoelectronic component designed to emit or to receive a light signal via its upper surface along an optical axis, the optoelectronic component being fixed onto the top of the carrier electronic board and electrically connected to the circuit of the electronic board either directly or, where relevant, via an electronic control component;

an annular alignment ring, arranged around the electronic component while being fixed to the electronic board, the annular ring comprising a central opening coming out opposite the optoelectronic component;
a mechanical sub-assembly comprising:
a fixed fiber optic running around the central axis;
a holding and alignment connection designed to both hold and center the fixed fiber optic ferrule of the sub-assembly.

In the module according to the invention, the holding and alignment connection is mechanically aligned and centered by the alignment ring while being fixed onto the latter, such that the fiber ferrule is pushed into the central opening of the annular ring with the central axis (X1) of the optical ferrule coincident with the optical axis (X).

Advantageously, the distance from the end of the fiber ferrule to the surface of the optoelectronic component is fixed by the end stop of the connection against the alignment ring, the end stop of the connection defining the distance from the end of the ferrule with respect to the connection.

According to one advantageous embodiment, the mechanical sub-assembly furthermore comprises a fixing collar designed to both hold and center the fiber optic ferrule within it, the collar being designed to accommodate a complementary optical ferrule and a holding cage designed to hold the fixing collar with inner centering.

According to another advantageous embodiment, the component(s) is(are) encapsulated inside a closed encapsulation cavity (C) bounded by the alignment ring and the ferrule.

This encapsulation cavity is preferably partially or completely filled with a transparent resin (R) designed to optimize the optical coupling between the ferrule and the optoelectronic component.

According to one advantageous variant, the connection has a peripheral surface in plane-to-plane contact against the peripheral surface of the alignment ring.

According to this variant, the fiber optic ferrule is preferably held in the connection in such a manner that the face of its free end is in the plane (P) of the peripheral surface of the connection and hence in the contact plane between ring and connection.

Advantageously, the optoelectronic component or, as the case may be, the electronic control component is bonded or brazed or fixed according to a technique referred to as "flip chip" directly onto the surface of the electronic board.

According to one variant embodiment, the sub-assembly may comprise a shim bonded or brazed or fixed according to a technique referred to as "flip chip" directly onto the surface of the electronic board or, as the case may be, directly onto the electronic control component, itself bonded or brazed or fixed according to a flip-chip technique on the shim, the shim being inserted between the surface of the electronic board and the optoelectronic component or, as the case may be, between the electronic control component and the optoelectronic component.

According to one advantageous variant, the carrier electronic board is a folded printed circuit, so as to form an angled part for the electrical connections with another electronic board or with electronic equipment.

The invention also relates to an optoelectronic module comprising one or more sub-optical assemblies mounted onto another electronic board, notably fixed onto another electronic board in a housing, and able to be connected to an application board.

An "optoelectronic component" here and in the framework of the invention is understood to mean naked components or chips, in other words which are not enclosed in a package or, in other words, encapsulated in an electrically insulating coating, commonly referred to as "packaging".

"Control electronic components" here is understood to mean control components which may also take the form of naked components. However, they may also be encapsulated and situated within the module.

The carrier electronic board may be a flexible circuit and be folded at a right angle. It may also be rigid and in two parts bonded at a right angle. However, depending on the applications, this board may not have an angle and be only in one plane.

It is noted that, in the framework of the invention, the carrier electronic board of the optoelectronic module is a printed circuit or a stacking of layers of dielectric materials, within which an electrical circuit is formed.

The electronic board of the module is necessarily independent of the application or end use electronic board on which the module according to the invention is intended to be fixed. The attachment of an optoelectronic module according to the invention onto an application board may be formed by the electrical interconnections of the latter.

The optical sub-assembly according to the invention may form a transmitter sub-assembly, the electronic control component being a control for circuit surface-emitting optoelectronic components. This may be a control circuit for a surface-emitting vertical cavity laser diode of the VCSEL type, or a LED diode or any other vertical photo-transmitter component.

The optical sub-assembly according to the invention may also form a receiver sub-assembly, the electronic control component being a transimpedance amplifier, and the optoelectronic component being a photodiode, notably a PIN photodiode.

The optoelectronic module according to the invention may form a transmitter module which comprises one or more transmitter sub-assemblies. An optoelectronic receiver module according to the invention comprises one or more receiver sub-assemblies. A module according to the invention may be mixed and combine the two transmitter and receiver functions. The optoelectronic module may be single-channel or multi-channel.

A multi-channel optoelectronic module forms a transceiver, comprising at least one transmitter sub-assembly according to the invention, at least one receiver sub-assembly according to the invention, and a common electronic board to which the optoelectronic components with their control electronic components are electrically connected.

Advantageously, the printed circuit of the receiver module and that of the transmitter module are folded at a right angle such that the optical axes of said optoelectronic modules are parallel to the substrate of the common electronic board.

The optical fibers used with a sub-assembly according to the invention may be of various types, for example multi-mode optical fiber with a 50 µm core or a 62.5 µm core. Fibers of the single-mode type may also be used depending on the applications targeted.

According to the invention, the alignment ring allows the mechanical sub-assembly to be mechanically aligned and to be centered in a passive manner directly upon installation and hence the optical axis of the optoelectronic component to be readily aligned with the axis of the fiber optic ferrule and hence with the optical fiber extended by a complementary ferrule which is accommodated facing it in the holding cage.

There is accordingly no need for a specific and specialized tooling, which may be costly, for mechanically aligning the optical axis of the optoelectronic component with the optical axis of an optical fiber while the components are powered.

Thus, by virtue of the invention, an optical sub-assembly is obtained which is compact, robust and perfectly adapted to challenging environments, notably with high levels of humidity, and whose cost of assembly is reduced due to the fact that it is no longer necessary to have an active alignment as in certain modules and/or with an optical lens according to the prior art.

DETAILED DESCRIPTION

Other advantages and features of the invention will become more clearly apparent upon reading the detailed description of exemplary embodiments of the invention presented by way of non-limiting illustrations and with reference to the following figures, amongst which:

FIG. 1 is a schematic perspective view of one exemplary embodiment of a transceiver optoelectronic module integrating two optical sub-assemblies according to the invention, one of which is a transmitter sub-assembly (TOSA) and the other a receiver sub-assembly (ROSA);

FIG. 2 is a perspective view of an example of an optical sub-assembly according to one variant of the invention, FIG. 3A is a cross-sectional view of the sub-assembly according to FIG. 2 in the receiver version (ROSA), FIG. 3B is a cross-sectional view of the sub-assembly 2 according to FIG. 3A furthermore comprising a fixing collar and the holding cage, FIG. 4 is a detailed view of FIG. 3 showing the various components, ring and mechanical sub-assembly of the aligned module, FIG. 5 is a detailed view in perspective of an example of an optical sub-assembly in the transmitter version (TOSA) according to one variant of the invention.

Throughout the application, the terms "vertical", "lower", "upper", "low", "high", "under", "over" are to be understood with reference to the direction of stacking of the various components of an optical sub-assembly according to the invention.

FIG. 1 shows a transceiver module T integrating an optical transmitter sub-assembly $M_E$ (TOSA) according to the invention and an optical receiver sub-assembly $M_R$ (ROSA) also according to the invention.

The transceiver T comprises an electronic board 10 onto which the two sub-assemblies $M_E$, $M_R$ are fixed by means of their respective carrier electronic boards 1.

The board 10 will be used as an interface with an application electronic board or electronic equipment.

More precisely, each optical sub-assembly $M_E$, $M_R$ according to the invention comprises a carrier electronic board 1 which is folded, at a right angle in the example illustrated, and fixed and electrically connected to the common electronic board 10.

In place of a printed circuit board (or PCB) 10, there may also be an electronic board whose substrate is composed of a stacking of layers or sheets of dielectric materials, such as alumina, and within which a circuit of electrical conductors is arranged.

Thus, a part 11 of each carrier board 1 is in plane-to-plane contact against the substrate of the common electronic board 10, whereas the other part 12, which is bent, is inclined, at a right angle in the example illustrated, with respect to the substrate of the board 10.

The conducting tracks 13 come out at the end of the bent part 12 in order to form the electrical connection with those of the common board 10.

On the non-bent part 11 of each carrier board 1 an alignment ring 2 is fixed on which a mechanical sub-assembly 3 is aligned and fixed by means of its component forming a connection 30 as explained hereinbelow.

With this arrangement, the optical axis X of each optoelectronic module $M_E$, $M_R$ is parallel to the substrate of the common board 10 although the optoelectronic components selected emit or receive the optical signals via their surface.

This arrangement is advantageous because all of the components of the sub-assemblies extend along the axis X parallel to the substrate of the common board and hence the total height is greatly reduced. For other applications, this limitation may not be necessary and the carrier board may not have any angle.

Figure 1:
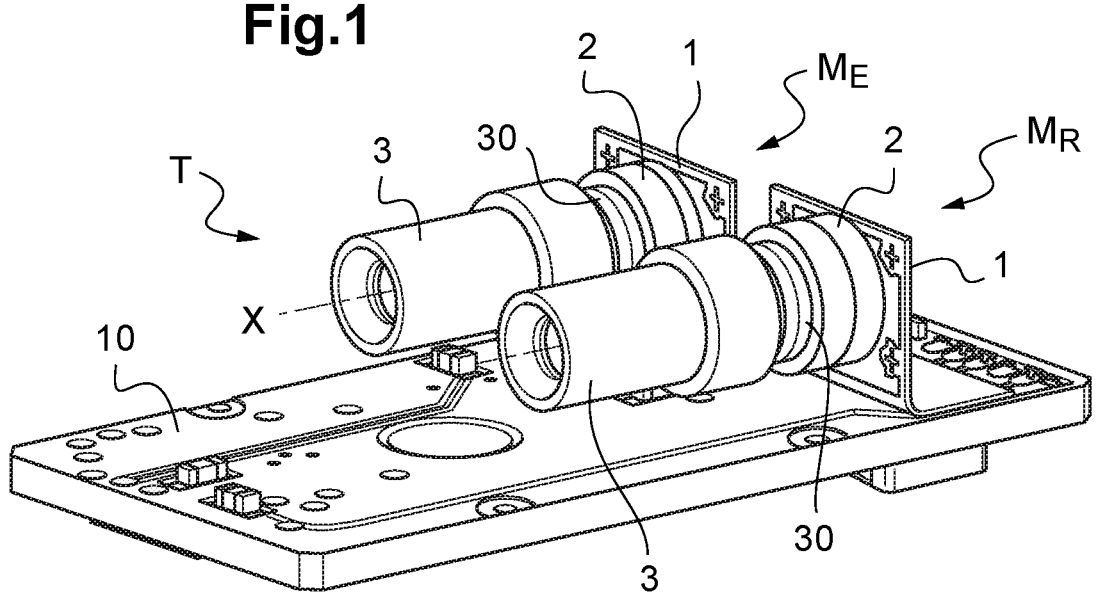

First of all, the various active electronic elements of the sub-assembly M are stacked one on top of the other and fixed together, preferably by bonding, for example by means of an epoxy adhesive or by brazing.

Thus, from bottom to top of the stack, the sub-assembly $M_R$ comprises:

the printed circuit 1;

an electronic control component 4 directly fixed onto the printed circuit 1 and electrically connected to the electronic circuit via soldered wires 40 according to a "wire-bonding" or bridging technique;

an optoelectronic component 5 designed to receive a light signal via its upper surface along an optical axis X, the optoelectronic component being electrically connected to the electronic component 4 by a wired micro-cabling technique, for example by means of soldered wires 50, or by a "flip-chip" assembly technique or other electronic interconnection techniques of conventional microelectronics;

where needed, a shim 6 made of electrically insulating material, such as a ceramic, is inserted between the two components 4, 5.

The components 4 and 5 are naked components, in other words non-encapsulated.

In the stacking illustrated, the shim 6 is directly fixed onto the top of the electronic control component 4 and the optoelectronic component 5 is fixed onto the top of the shim 6. These attachments may be carried out by bonding using for example an epoxy resin adhesive or by brazing.

Figure 3B:
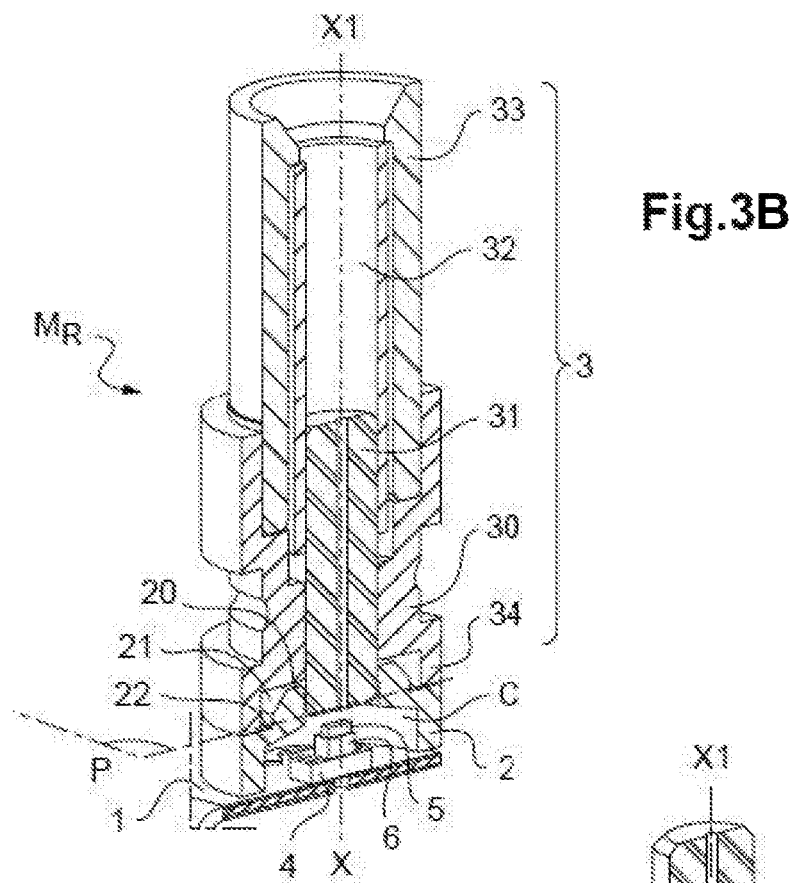
FIG. 3 shows all the components of a receiver sub-assembly $M_R$ (ROSA) such as it is assembled.
Figure 3A:
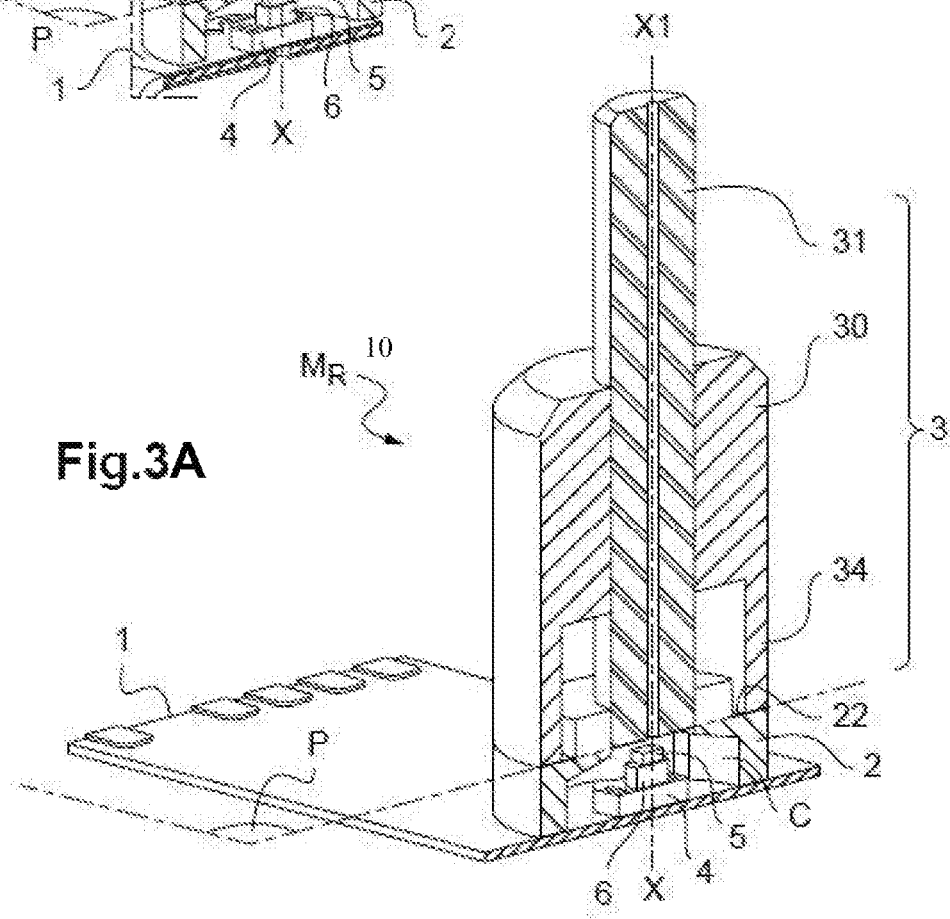
Figure 4:
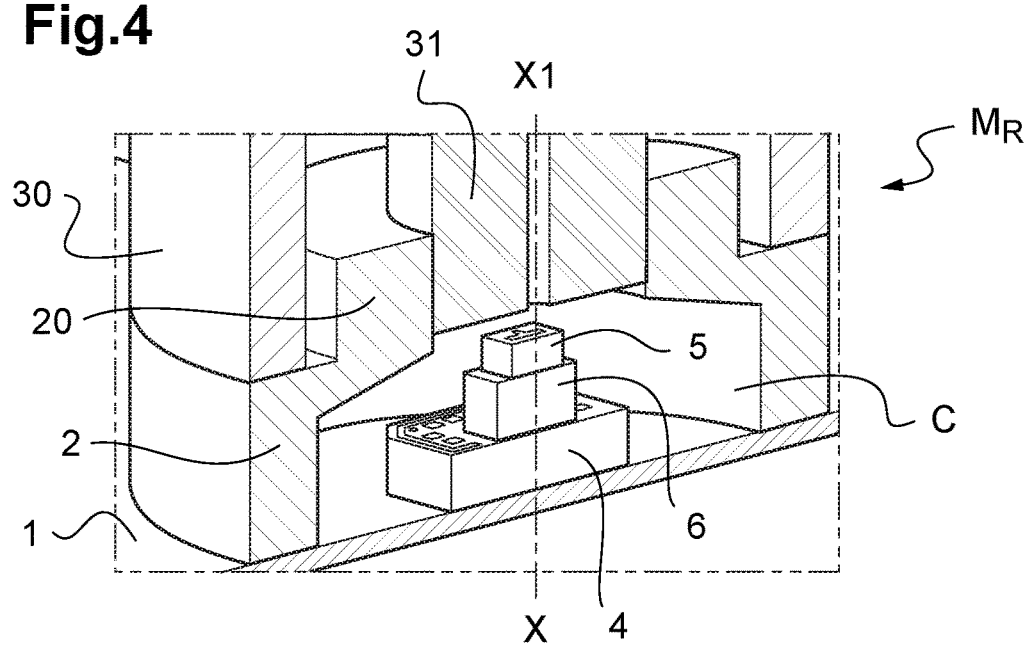
Figure 5:
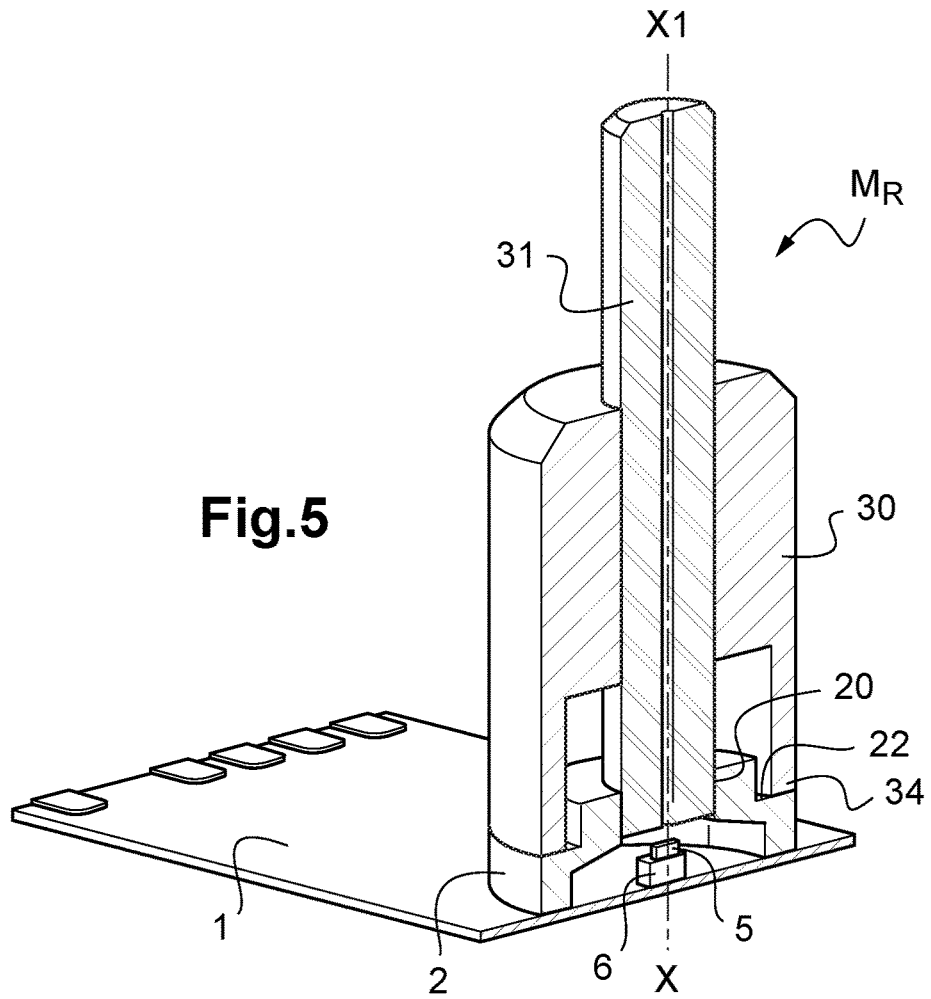

Such as illustrated in FIGS. 3 and 4, when the optical sub-assembly according to the invention is a receiver sub-assembly, the optoelectronic component 5 is then a photo-diode of the PIN type and the electronic control component 4 is a transimpedance amplifier for a photodiode.

Such as illustrated in FIG. 3A, the mechanical sub-assembly 3 comprises, in addition to the connection 30 aligned with centering and fixed onto the ring 2:

a fiber optic ferrule 31 which runs around its central axis X1, a fixing collar 32 which both holds and centers the optical ferrule within it, the collar being designed to accommodate a complementary optical ferrule for transmission of the light signal, a holding cage 33 which both holds and centers the fixing collar 32 within it.

Depending on the applications and/or the upper shape of the collar, the fixing collar and the holding cage may be optional.

The connection 30 holds and centers both the cage 33 and the optical ferrule 31.

According to the invention, the connection 30 is mechanically aligned by the alignment ring 2 while being fixed onto the latter, preferably by bonding.

With this mechanical alignment, the ferrule 31 is pushed into the open central opening 20 of the annular ring 2 with the central axis X1 of the ferrule 31 coincident with the optical axis X.

With the ferrule 31, the ring 2 defines a closed encapsulation cavity C inside of which the electronic components 4, 5 and the shim 6 are encapsulated.

In order to optimize the optical coupling between ferrule 31 and optoelectronic component 5, the encapsulation cavity C may advantageously be partially or completely filled with a transparent resin. The resin could be of the EPO-TEK-301-2FL type for example.

Furthermore, the cavity C thus filled renders the components 4, 5 less sensitive to humidity.

Furthermore, the connection 30 has a peripheral surface 34 which is in plane-to-plane contact P against the peripheral surface 22 of the alignment ring 2.

Preferably, the optical ferrule 31 is held in the connection 30 in such a manner that the face of its free end is in the plane of the peripheral surface 34 of the connection and hence in the contact plane P between ring 2 and connection 30. This allows the axial position of the ferrule 31 with respect to the substrate of the electronic board 1 to be known with precision and hence, where necessary by calibrating the shim 6, the axial distance between optoelectronic component 5 and the face of the free end of the optical ferrule 31 to be very precisely defined in order to improve the optical alignment of the sub-assembly.

Figure 2:
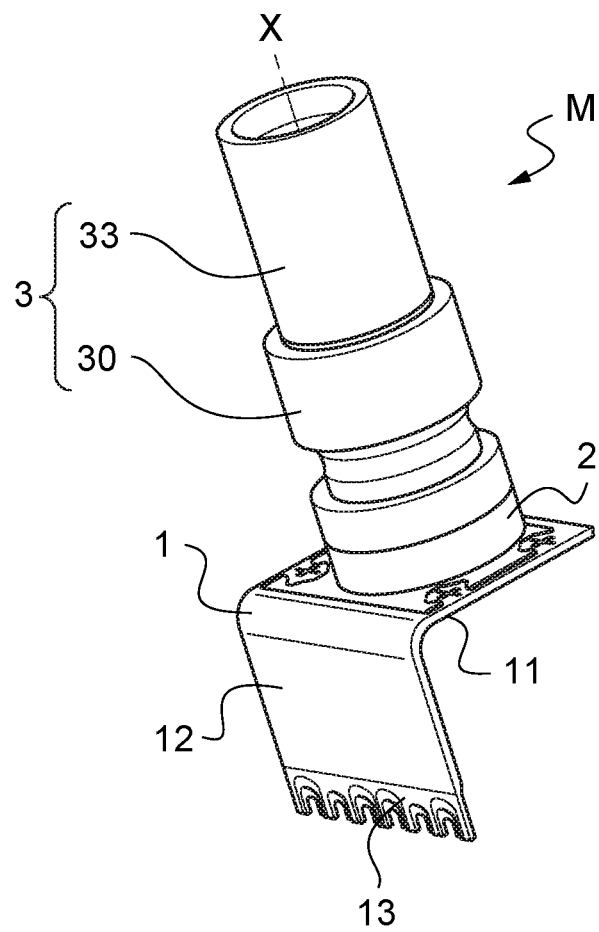
FIG. 2 shows a sub-assembly M according to the invention prior to its installation and electrical connection onto an electronic board, such as the board 10 in FIG. 1.

As illustrated in FIG. 2, when the optical sub-assembly according to the invention is a transmitter sub-assembly $M_E$, the optoelectronic component 5 is a vertical-cavity surface-emitting laser (or VCSEL) or any other surface-emitting optoelectronic component.

By virtue of the invention, a multi-channel transceiver module T is obtained which may comprise both at least one emitter sub-assembly per laser diode and at least one transmitter sub-assembly per photodiode, which is compact, robust and adapted to harsh environments, notably with a high level of humidity, and whose cost of assembly is limited owing to the absence of a need for active alignment such as in a module with an optical lens according to the prior art.

Other variants and improvements may be provided without however straying from the scope of the invention.

The expression "comprising a" should be understood as being synonymous with "comprising at least one", except where the contrary is specified.

What is claimed is:

1. An optical sub-assembly for an optoelectronic module, the optical sub-assembly designed to provide conversion of an electrical signal from an electronic board into an optical signal or vice-versa, the optical sub-assembly comprising:
    a carrier electronic board, designed to serve as an interface with another electronic board;
    an optoelectronic component having an upper surface, said optoelectronic component configured to emit or to receive a light signal via said upper surface along an optical axis, the optoelectronic component being fixed onto a top of the carrier electronic board and electrically connected to a circuit of the carrier electronic board directly or via an electronic control component;
    an annular alignment ring arranged around the optoelectronic component while being fixed to the carrier electronic board, the annular alignment ring comprising a central opening that opens opposite the optoelectronic component;
    a mechanical sub-assembly comprising:
    a fixed fiber optic ferrule having a central axis;
    a holding and alignment connection designed to both hold and center the fixed fiber optic ferrule of the sub-assembly relative to the optical axis,
    wherein the holding and alignment connection is fixed onto the annular alignment ring and mechanically aligned and centered in a passive manner by the annular alignment ring such that the fiber optic ferrule is pushed into the central opening of the annular alignment ring with the central axis of the fiber optic ferrule coincident with the optical axis; and
    wherein a distance from an end of the fiber optic ferrule to the upper surface of the optoelectronic component is fixed by an end stop of the holding and alignment connection against the annular alignment ring, the end stop defining the distance from the end of the fiber optic ferrule with respect to the holding and alignment connection, and
    wherein the fiber optic ferrule is configured to be inserted into the holding and alignment connection such that the end of the fiber optic ferrule is alignable co-planarly with a bottom surface of the holding and alignment connection and thus co-planar with the end stop.

2. The optical sub-assembly as in claim 1, wherein the mechanical sub-assembly furthermore comprises a fixing collar designed to both hold and center the fiber optic ferrule within the fixing collar, the fixing collar configured to accommodate a complementary optical ferrule and a holding cage that is configured to both hold and center the fixing collar within the holding cage.

3. The optical sub-assembly as in claim 1, forming a transmitter sub-assembly, the optoelectronic component being a surface emitting laser.

4. The optical sub-assembly as in claim 1, forming a receiver sub-assembly, the optoelectronic component being a photodiode.

5. The optical sub-assembly as in claim 1, wherein the optoelectronic component and the electronic control component are encapsulated inside a closed encapsulation cavity bounded by the annular alignment ring and the fiber optic ferrule.

6. The optical sub-assembly as in claim 5, wherein the encapsulation cavity is at least partially filled with a transparent resin configured to at least partially provide an optical coupling between the fiber optic ferrule and the optoelectronic component.

7. The optical sub-assembly as in claim 1, wherein the holding and alignment connection has a peripheral surface in plane-to-plane contact against a peripheral surface of the annular alignment ring.

8. The optical sub-assembly as in claim 7, wherein the fiber optic ferrule is held in the holding and alignment connection in such a manner that a face of a free end is in a plane of the peripheral surface of the holding and alignment connection and in a contact plane of the plane-to-plane contact between the annular alignment ring and the holding and alignment connection.

9. The optical sub-assembly as in claim 1, wherein the optoelectronic component or the electronic control component is at least one of bonded, brazed or fixed according to a flip-chip technique directly onto the surface of the carrier electronic board.

10. The optical sub-assembly as in claim 1, comprising a shim bonded, brazed or fixed according to a flip-chip technique directly onto the surface of the carrier electronic board.

11. The optical sub-assembly as in claim 1, wherein the carrier electronic board is a folded printed circuit having an angled part for electrical connection with the another electronic board or with further electronic equipment.

12. An optoelectronic module, comprising the another electronic board and at least one optical sub-assembly as in claim 1 mounted onto the another electronic board.

13. A multi-channel optoelectronic module forming a transceiver, the multi-channel optoelectronic module comprising:
 a pair of sub-assemblies, each as in claim 1, a first sub-assembly of the pair wherein the respective optoelectronic component is a surface emitting laser and thus forming a transmitter sub-assembly, and a second sub-assembly of the pair wherein the respective optoelectronic component is a photodiode and thus forming a receiver sub-assembly, and
 a common electronic board to which the respective optoelectronic components and the respective control electronic components of the pair of sub-assemblies are electrically connected.

14. A transceiver as in claim 13, wherein the carrier electronic board of the receiver sub-assembly and the carrier electronic board of the transmitter sub-assembly each are folded at a right angle such that the respective optical axes of said sub-assemblies are parallel to the substrate of the common electronic board.

15. The optical sub-assembly as in claim 1, comprising a shim bonded, brazed or fixed according to a flip chip technique directly onto the electronic control component, the electronic control component itself being bonded, brazed or fixed according to a flip-chip technique onto the shim, the shim being inserted between the surface of the electronic board and the optoelectronic component or between the electronic control component and the optoelectronic component.

* * * * *